May 17, 1955
A. WAGNER ET AL
2,708,395
DEVICE FOR TAKING FLASH PICTURES
WITH A CURTAIN SHUTTER CAMERA
Filed June 24, 1952
6 Sheets-Sheet 5
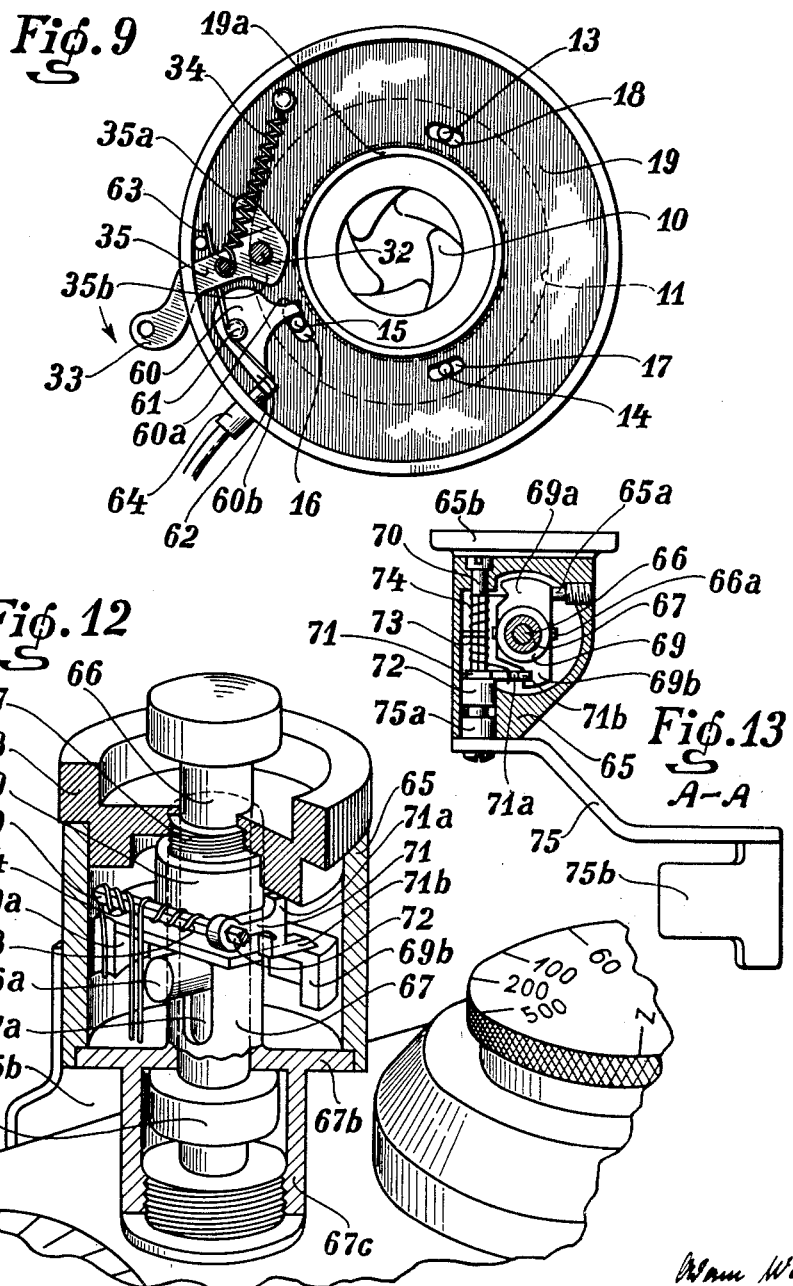
INVENTOR.

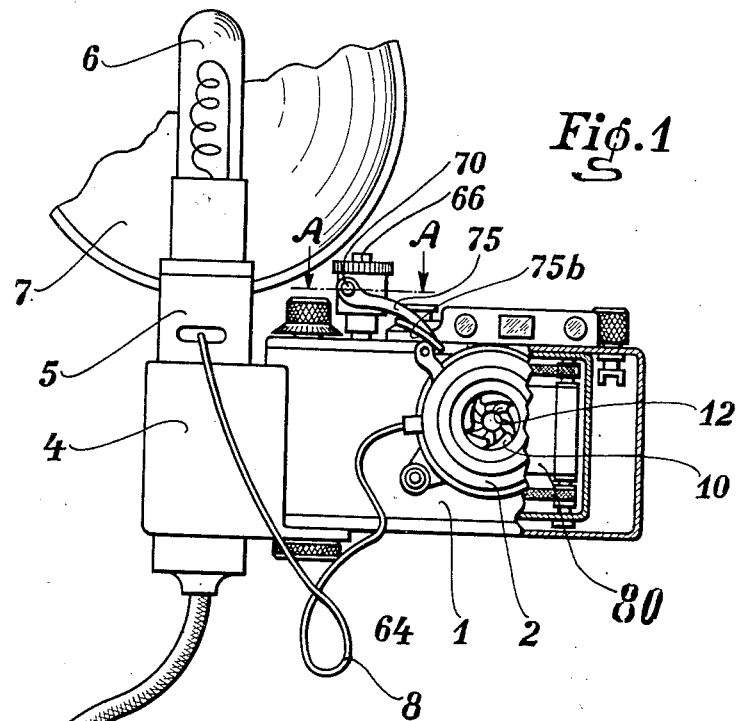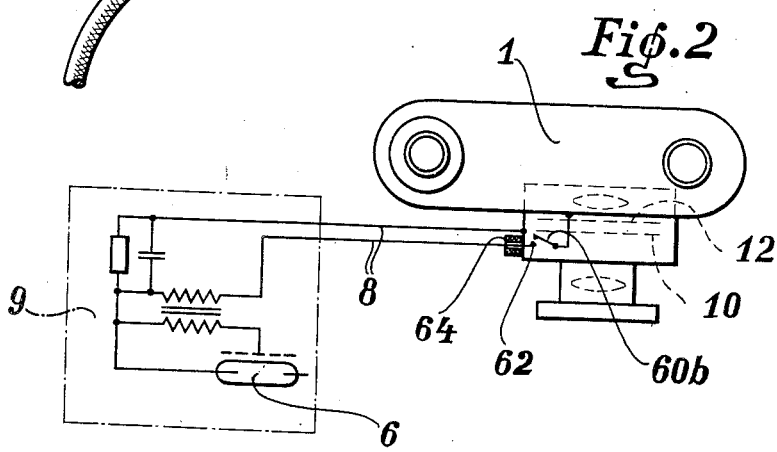

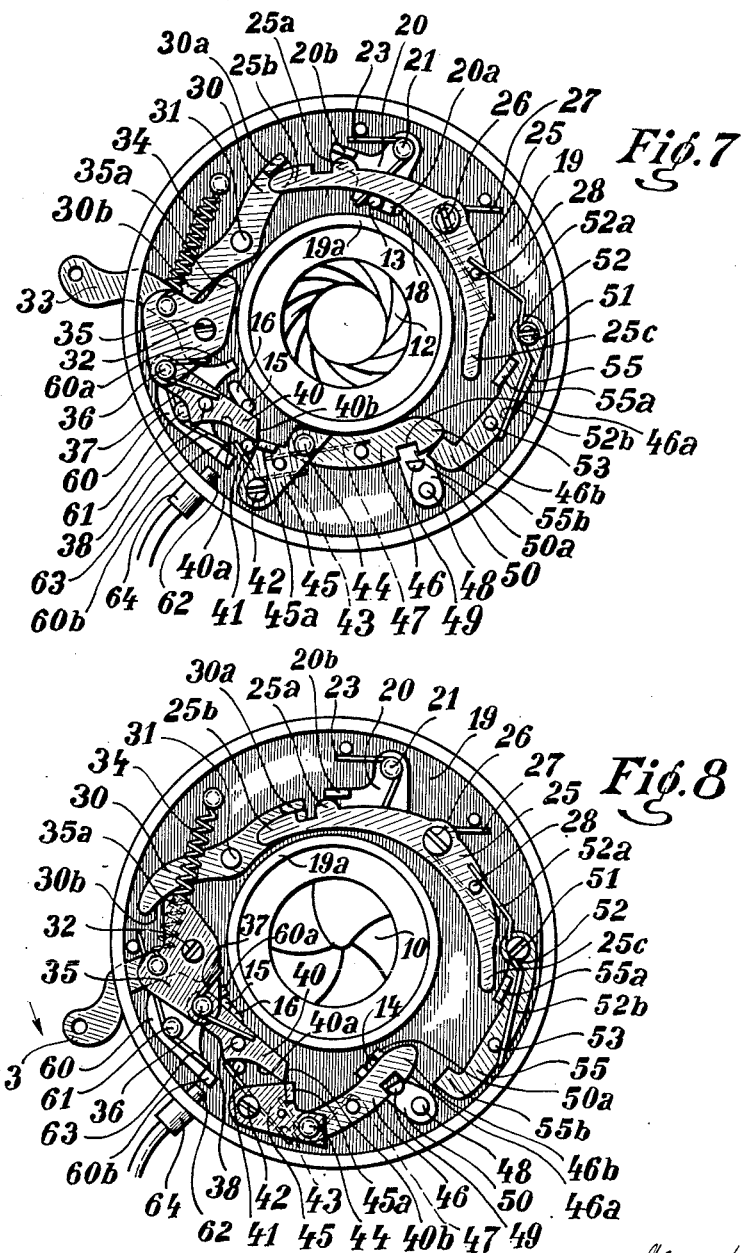

United States Patent Office 2,708,395
Patented May 17, 1955

2,708,395

DEVICE FOR TAKING FLASH PICTURES WITH A CURTAIN SHUTTER CAMERA

Adam Wagner, Wetzlar (Lahn), and Willi Wiessner, Merlau, Kreis Alsfeld, Germany, assignors to Ernst Leitz, G. m. b. H., a corporation of Germany Application June 24, 1952, Serial No. 295,176

Claims priority, application Germany August 8, 1951

7 Claims. (Cl. 95—11.5)

It is known that in taking flash pictures with a curtain shutter camera there are certain disadvantages. Either relatively slow burning flashes must be used, the flash period of which is longer than the time required for the running off of the curtain slit, or flash pictures with a curtain shutter camera can be made only by using such shutter speeds at which the entire picture window remains open during the running off movement of the shutter.

These disadvantages are particularly annoying when a tubular flash is used because, although such flashes have great illuminating powers, they last but a short time. Such flashes can therefore be used only with such exposures—up to $\frac{1}{30}$— at which the curtain slit completely uncovers the picture window when the shutter is released. Local existing light conditions may also cause exposure errors because of the relatively long time during which the shutter is open.

It has been proposed to overcome these disadvantages by using an objective shutter in a curtain shutter camera in front of the camera objective, such objective shutter including the ignition device for the flash unit. With such an arrangement the curtain shutter slit must first be opened or remain open so long as the objective shutter is used. This in turn leads to mistakes in the required manual manipulation and exceptional picture taking opportunities may be lost, never to return. Then again, the use of an objective shutter placed outside the plane of the objective diaphragm is objectionable for obvious optical reasons.

In order to overcome or eliminate the disadvantages referred to, this invention proposes an improved mechanism for taking flash pictures, especially with a tubular flash with a curtain shutter camera, in which the objective is provided with an objective shutter—preferably a between lens shutter—with an ignition device.

The object of the invention is to provide a shutter mechanism in which a curtain shutter of known construction and operation and an objective shutter with normally opened shutter laminae are operated in dependence upon one another by means of a common release mechanism so that a cycle of operations may be performed in which first the shutter laminae are closed, then the curtain shutter opened and thereafter the flash circuit closed and the snap shot taken with the objective shutter.

When the operation is finished, the curtain shutter release is again automatically set free, but the release for the objective shutter is returned to normal position only after the common release device has been returned to starting position whereby the shutter laminae are again opened. The curtain shutter is set for "long time" exposures. The objective shutter may be exchangeable and is located adjacent the objective focal plane. The objective shutter is of special design and construction and is provided with shutter laminae which are normally open.

The "long time" exposure for the curtain shutter is set by means of the camera timing knob and controlled by an escapement in order to insure that the moving shutter curtains do not obstruct the picture window while the objective shutter is operated (so-called long exposure). It is however, more expedient to set the curtain shutter on "B" time whereby the actuated curtain shutter releases the first curtain for its run-off movement and the opening of the picture window, and only after the flash picture has been taken with the objective shutter, the second curtain is unlocked for its run-off movement to again close the picture window.

The common release device is so arranged for the purpose of uncovering the picture window that the curtain shutter alone with its range of exposures may be set free as well as the objective shutter with its range of exposures in dependence upon the release of the curtain shutter.

Accordingly the invention is embodied in a flash device for curtain shutter camera as described and claimed in the following specification and as illustrated in the accompanying drawings in which:

Fig. 1 is a front view of a curtain shutter camera with objective shutter and flash device, parts being in section and parts broken away.

Fig. 2 is a diagram of the camera and flash unit circuit.

Figs. 3 through 11 are views looking toward the objective of the camera from the rear and along the optical axis thereof and show the details of the objective shutter mechanism with the parts in different positions. A detailed description of these figures will best be understood in connection with a description of the invention.

Fig. 12 is an enlarged perspective view of the common shutter release mechanism which is attached to the camera, parts being in section and parts broken away.

Fig. 13 is a sectional view taken on the line A—A of Fig. 1 and illustrates parts of the common release.

Figure 3:
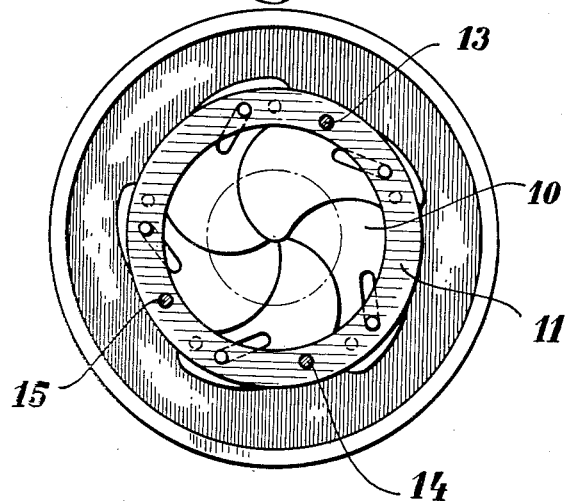

Fig. 1 shows a curtain shutter camera 1 of known type, for example, the Leica camera, with exchangeable objective in an adjustable support 2. The camera shutter 80 is as usual released by a shutter release 3. The camera carries a flash unit 9 which includes a base 4 with a socket 5 for the tubular flash bulb 6. A reflector is shown at 7. Wires 8 connect the unit 9 with a push-in plug 64 which is insertable in the objective shutter.

Figure 4:
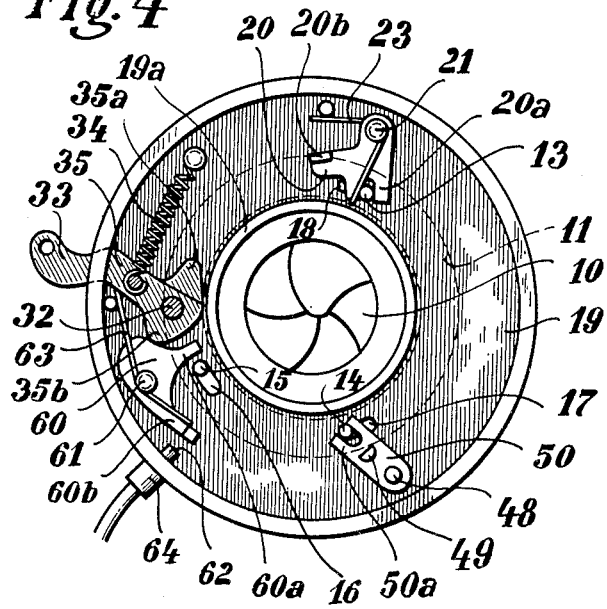

The camera objective has a spring tensioned objective shutter between lens shutter in which the shutter laminae 10 are swingably mounted in a known manner and opened and closed by a laminae ring 11 which is coaxial with the optical axis of the objective. The usual adjustable diaphragm is shown at 12. As seen in Figs. 3 and 4, the ring 11 carries three pins 13, 14 and 15 which project rearwardly through slots 16, 17 and 18 in a cover plate 19 which in turn supports the mechanism for rotating the ring 11 by way of the said pins. When the pins are moved circularly about the optical axis the ring 11 is rotated in its own plane and in turn causes the opening and closing of the laminae 10 by means shown in Fig. 3 as will be understood.

The pin 13, Fig. 4, is moved in the slot 18 in cover plate 19 by means of a swinging plate 20 which has a fork 20a embracing the pin. The plate is pivoted at 21 on the plate 19 and a spring 23 engages the pin to keep it at one end of the slot 18 as shown. This position of the pin 13 corresponds to the closed position of the laminae 10. The plate 20 also has a tooth 20b adapted to engage a two armed lever 25, Fig. 5.

The two armed lever 25 is pivoted on the plate 19 at 26. On the left hand side of the pivot 26 the lever 25 is formed with a lug 25a engaged by the said tooth 20b and is also formed with a cam 25b. The other arm of the lever ends with a tongue 25c. A spring 27 keeps the lug 25a in engagement with the tooth 20b as shown. The lever 25 also carries a pin 28.

A second two armed lever 30 is pivoted on the plate 19 at 31 and has a tooth 30a engaging the aforesaid cam 25b. The other arm of lever 30 forms a cam 30b engageable by a finger 35a formed on a swingable triangular plate 35 which is pivoted at 32 on the plate 19. A release lever 33 is secured to the plate 35 for operation of the objective shutter and extends to the outside. A spring 34 is connected to the plate 35 and tends to move the finger 35a into contact with the circular flange 19a of the plate 19. The flange encloses the optical elements, not shown in the drawing.

Figure 6:
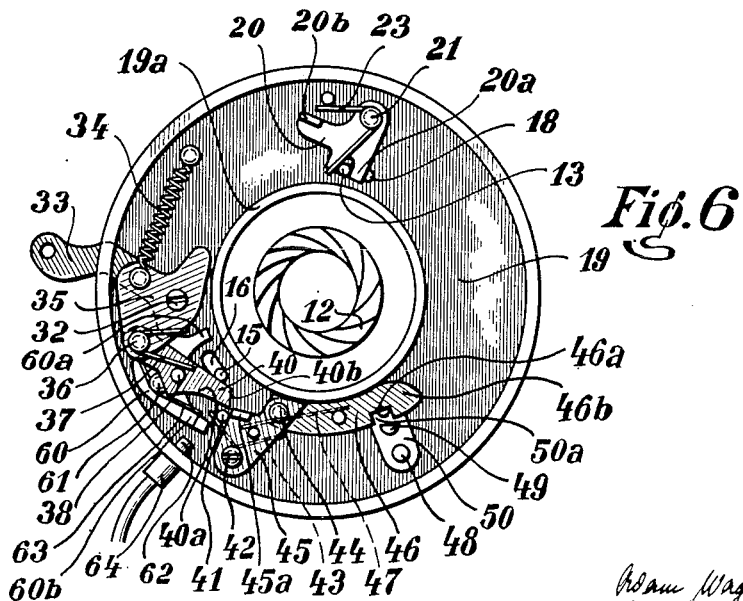
Figure 10:
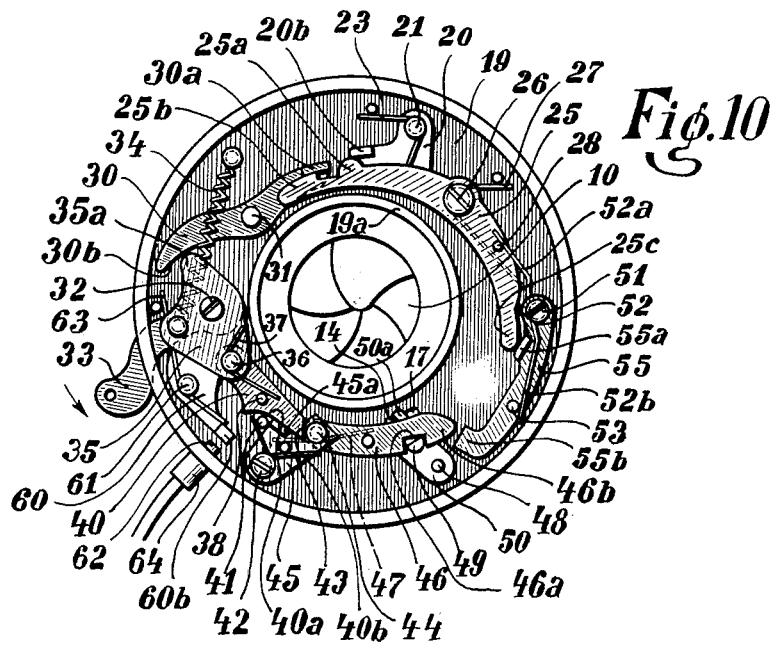

The plate 35, Fig. 6, is linked to a pusher arm 40 by a pivot bolt 36. The arm extends within the range of a lever 45. The pusher arm 40 carries a pin 38 and is formed with a cam 40a. A spring 37 acting on the pin 38 tends to keep the pusher arm cam 40a in sliding engagement with a pin 41 fixed on the plate 19. The arm 40 ends in a tooth 40b adapted to engage a lug 45a on a lever 45. The latter is pivoted on the plate 19 at 42. A spring 43 tends to keep the lever 45 against the fixed pin 41.

A link bolt 44 in the lever 45 connects the latter pivotally with a link 46 which is provided with a notch 46a adapted to receive a tooth 49 on a finger 50 which is pivoted at 48. A spring 47 tends to keep the cam 46b of the link 46 in sliding contact with the tooth 49 on finger 50 as will appear later on. The finger 50 ends in a fork 50a which embraces the aforesaid pin 14 on the ring 11.

The cam 46b of the link 46 extends into the range of movements of the finger 50, as described, and also extends into the range of movements of a one armed lever 55 which is pivoted at 51. A spring 52 on the pivot 51 forms two arms. One, the arm 52a, engages a pin 28 in the lever 25. The other spring arm 52b engages a pin 53 in the lever 55. The two springs 25 and 55, respectively, serve to move the levers 25 and 55, respectively, inwardly toward the optical axis of the objective. Lever 55 has a lug 55a which is adapted to engage the tongue 25c of the lever 25 and it is formed with a tooth 55b adapted to engage the cam 46b on the link 46, Fig. 7.

Figure 5:
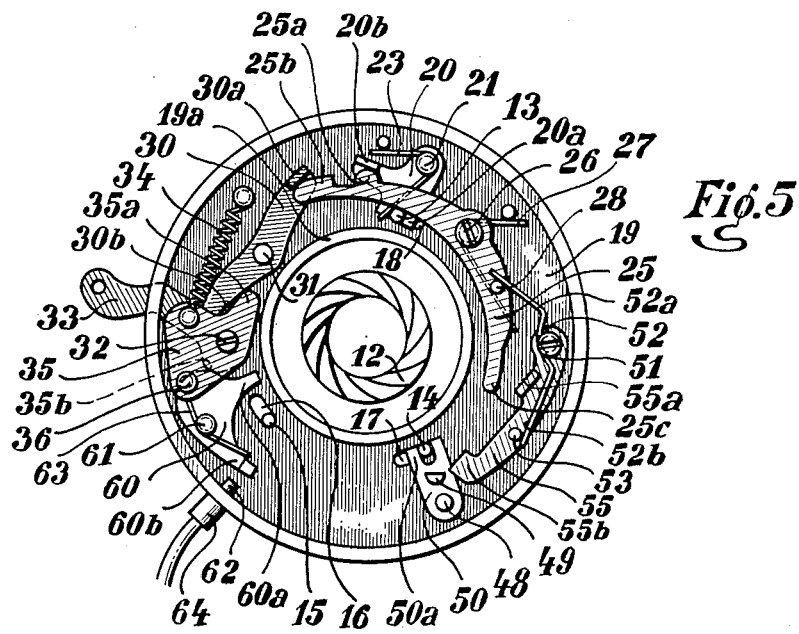

Figs. 3 and 4 show the laminae shutter 10 closed and the positions of the three pins 13, 14 and 15 which are fixed in the ring 11 and project rearwardly therefrom. The pins are moved circumferentially of the optical axis and rotate the ring 11 to open and close the laminae. Fig. 4 shows the swinging plate 20 and the finger 50 for moving the pin 14. Figs. 5 and 6 show additional parts of the release mechanisms. Figs. 7 and 8 illustrate the several levers and associated parts in different positions.

The laminae 10 being in normally open position, the objective shutter is operated as follows: The release 33 is pressed down from its normal position in Fig. 7 to the position in Fig. 8 as indicated by the arrows. All the levers are then moved as appears from the different positions in these figures. The release spring 34 is then tensioned. The release plate 35 transfers the releasing movement upwardly to the two armed lever 30 and downwardly to the pusher arm 40. The lever 30, in turn, transfers the movement to the other two armed lever 25 via the tooth 30a and the plate 25b so that the lug 25a is lowered and the plate 20 is free to swing to the right by the spring 23 whereby the fork 20a moves the pin 13 to rotate the ring 11 and the laminae now close, Fig. 8. The springs 27 and 52 are now tensioned.

The pusher arm 40 moves the lever 45 in a clockwise direction, Fig. 8, and by means of the pivot bolt 44 this movement is transferred to the link 46 and continues as long as the tooth 40b on pusher arm 40 remains in operative contact with the lug 45a on the lever 45.

The spring 47 now causes a gliding movement of the cam 46b of link 46 upon the tooth 49 of the finger 50 until said tooth enters the notch 46a. When this happens the link bolt 44 has passed beyond its dead center position relative to the finger 50 and is given a slight backwards push or return movement which is participated in by the link 46.

The movement of the link 46 is controlled by the cooperative movements of the cam 46b and tooth 55b on the lower end of the one armed lever 55, which, in accordance with its swinging movement about the pivot 51 caused by the tongue 25c upon the lever lug 55a, lifts the link 46 so that the tooth 49 can enter the notch 46a on the finger 50 simultaneous with the tensioning of the spring 52, Fig. 7.

After the tooth 49 has engaged the notch 46a, the tooth 40b slides off the lug 45 as the release continues its downward movement and also by reason of the sliding movement of the cam 40a upon the pin 41, so that the lever 45 by its spring 43 snaps back into starting position. Thereby, the link 46 and the finger 50 are also moved so rapidly that the fork 50a operating upon the pin 14 causes a snaplike opening of the laminae 10.

However, as soon as the link bolt 44 has passed the dead center position with respect to the finger 50, the spring 23 acts upon the forked plate 20 (top of Fig. 8) and together with the backwards snap movement of the link 46, causes a quick closing of the laminae 10. The link 46 is then released from the pin 49 in finger 50. The "flash picture" is now completed. The shutter 10 is closed, Fig. 8.

The snap shot movement of the laminae 10—quick open and quick close—for the purpose of taking a flash picture with the objective shutter is caused by the push-pull movement of the link 46 which movement is a result of the combined actions of the pusher arm 40, the lever 45 and the link together with the actions of their respective springs, as well as the guiding and steering action of the one armed lever 55 as described.

When the release 33 is returned to normal position by the release spring 34, all the elements of the release mechanism move back to normal positions as will be understood. The lug 25a of the two armed lever 25 engages the tooth 20b. The springs 27 and 52a move the swinging plate 20 and tension the spring 23. The plate then moves the pin 13 to rotate the ring 11 and the laminae 10 open and are back in normal position, Fig. 7.

Figure 11:
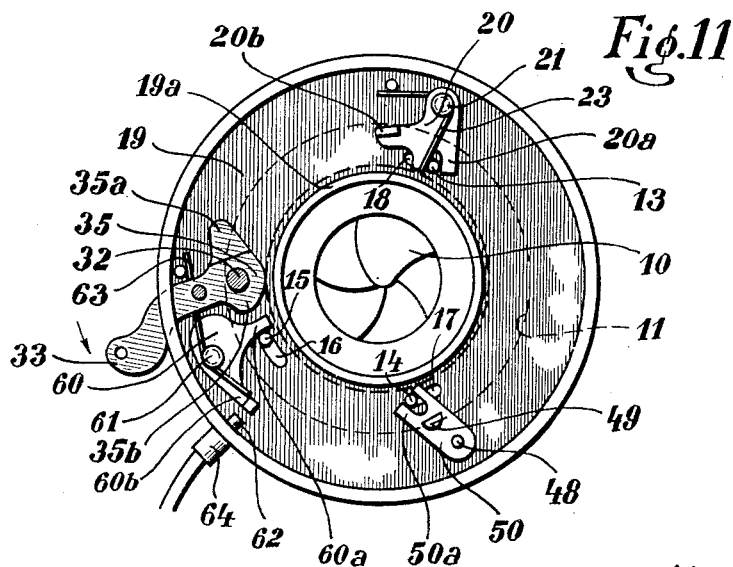

The objective shutter is combined with a switch device for closing the flash circuit. It comprises a rectangled lever 60 pivoted at 61 on the plate 19. Figs. 4, 9 and 11. One arm 60a is adapted to engage the aforesaid pin 15 in the ring 11. The other arm 60b is adapted to engage an insulated contact 62 by the force of a spring 63 to close the flash circuit when the pin 15 is moved away from the lever arm 60a. The contact 62 is connected to the push plug 64 for connection with the flash circuit, Fig. 2.

The flash circuit is closed when the release 33 is operated and right after the cam 40a slides off the tooth 45a of the finger 50. That is, the circuit is closed in a definite relation to the snap shot action of the laminae 10 in that as the arm 60a of the lever 60 is released from engagement with a cam 35b on the release 33, said arm 60a is moved by its spring 35 to engage the pin 15, Fig. 11. As the laminae 10 are opened as above described, the pin 15 moves away from the lever arm 60a and the spring 63 closes the other arm 60b upon the contact 64. When the release is returned to normal position by the spring 34, the cam 35b on arm 33 engages the switch lever 60 and disengages the arm 60a from the pin 15. The circuit is then again opened, Fig. 4.

The invention provides a release mechanism whereby the curtain shutter may be operated alone in the usual manner, and whereby the objective shutter may be opened in dependence upon the release of the curtain shutter. The mechanism is illustrated in Figs. 1, 12 and 13, and is contained within a cylindrical housing 65 which supports a stop 65a, Fig. 13. The housing is formed with a foot plate 65b which is adapted to engage a portion of the camera casing to insure the correct position of the objective shutter release with respect to the release lever 33. The housing 65 has a cover 68 at the top and at the bottom the housing is carried by a shelf 67b which is formed with a threaded nipple 67c. The shelf 67b carries a tube 67 which is threaded into the cover 68. Thus the tube 67 may be screwed into position on the camera by way of the threads in the cover and the nipple 67c. The tube contains the slidably supported curtain shutter release bolt 66 which rests upon the curtain shutter release 3. The bolt has pins 66a which slide in slots 67a in the tube 67.

The pins 66a support a latch 69 which is formed with an upstanding sleeve which surrounds the tube 67 and it has two transverse arms 69a and 69b. The latch 69 is rotatably mounted on the tube 67. A horizontal shaft 70 is rotatably supported in the housing 65, Fig. 13, and carries an arm 71. The shaft ends in a square coupling at 72. The arm 71 is formed with an upstanding nose 71a and a projecting finger 71b. A spring 74 is coiled about the shaft 70 and tends to move the arm 69 of the latch against the aforesaid stop 65a, Fig. 13. A second spring 73 is also coiled about the shaft 70 and tends to keep the upstanding nose 71a against the underside of the cover 68.

The coupling at 72 engages a second coupling sleeve 75a whereby a lever 75 outside the housing is coupled to the horizontal shaft 70. The lever 75 has a plate 77b which rests upon the objective release 33 when the common release is mounted upon the camera.

The operation is as follows: The common release device rests upon the curtain shutter release 3. The plate 75b rests upon the objective release 33. The laminae 10 are open. The curtain shutter is in wound up position. If only the curtain shutter is to be used for an exposure, then the release bolt 66 is depressed and the curtain shutter release thus directly operated. When the operator lets go of the bolt 66 the curtain shutter is closed by the usual means known to the art. The lever 75 and the objective shutter are not operated.

When a flash exposure is desired with the objective shutter in dependence upon the release of the curtain shutter the operator presses down upon the plate 75b of the lever 75. The objective shutter release is thus directly operated by the movement of the plate 75b upon the release 33 and the laminae 10 close as described above. At the same time, however, the shaft 70 is rotated via the couplings 75a and 72 so that the shaft finger 71b can depress the latch 69, which in turn moves the pins 66a and the release bolt 66 downward to actuate the curtain shutter release 3 to open the curtain shutter which has been set for time exposure.

The parts are so designed and proportioned in their movements that the curtain shutter is opened only after the laminae 10 are closed. When the plate 75b is depressed and the release 33 is moved down, the flash circuit is closed as described and a flash picture taken with the objective shutter. At the end of the releasing movement—the plate 75b is held down—the nose 71b slides away from the latch 69. Hereby, the curtain shutter release 3 and the release bolt 66 are returned by the usual spring means of the camera, not shown in the drawings, to the normal positions.

When the lever 75 is returned to normal position by the action of the spring 74, accompanied by resetting the objective shutter means under the action of the spring 34, the nose 71b on the arm 71 hits the latch 69 and rotates it against the force of the spring 74 until the nose can bypass the latch 69. The spring 74 moves the latch 69 back against the stop 65a. The arm 71 is then again positioned in the space between the housing 65 and the tube 67. After rewinding the curtain shutter and winding up the film in the usual manner, the camera is ready for another exposure.

The invention is disclosed in an embodiment which provides for a short predetermined exposure with the objective shutter so that strong flashes, but short time, flash bulbs may be used with a curtain shutter camera. It is of course understood that the objective shutter may be made adjustable by known means.

The focal plane shutter 80, Fig. 1, may be operated in the known manner by depressing the release bolt 66 which rests upon the camera release 3, the front shutter laminae 10 being normally open. When the front shutter is to be used for a flash picture, the operator depresses the common release lever 75, Figs. 1 and 13, to actuate both the shutter releases 3 and 33. The parts are so timed that first the laminae 10 are closed, Fig. 8, and thereafter the push-pull link 46 causes a quick oscillating movement of the finger 50a working upon the pin 14, so that a snap shot quick movement, open and close, of the laminae is effected and, of course, at the same time the flash circuit is closed so that the flash picture is taken.

The invention is susceptible of changes and modifications in the described embodiment. We claim all such modifications as may come within the principle of the invention and the scope of the appended claims.

We claim:

1. A mechanism for taking flash pictures with a curtain shutter camera comprising in combination, a curtain shutter camera, an objective thereon, a shutter on said objective including normally open shutter laminae, a flash unit operatively connected with said objective shutter, a release member for the curtain shutter, a release member for the objective shutter, a manually operated common release lever operatively engaging the said two release members so that movement of said common release lever actuates the said two release members to operate their respective shutters automatically and sequentially to close said shutter laminae, open the curtain shutter, open and close said objective shutter laminae and simultaneously therewith close said flash unit circuit for taking a snap shot flash picture with said objective shutter and means for returning the said shutters and the said three release members to normal starting positions.

2. A mechanism for taking flash pictures with a curtain shutter camera comprising in combination, a curtain shutter, camera, an objective thereon, a shutter on said objective including normally open shutter laminae, a flash unit operatively connected with said objective shutter, a release member for the curtain shutter, a release member for the objective shutter, a manually operated common release lever operatively engaging the said two release members so that movement of said common release lever actuates the said two members to operate their respective shutters in a predetermined sequence for taking a flash picture with the said objective shutter alone and so that the return movement of said common release lever liberates the said curtain shutter release member for normal curtain shutter operation before said common release lever reaches the end of its returning movement to cause the objective shutter to open.

3. A shutter mechanism for a photographic camera with flash unit attachment, said camera having a focal plane shutter and an objective with normally open objective shutter laminae comprising an electric flash unit operatively connected to the objective shutter with electric circuit terminals therein, a switch in said objective shutter to close the terminals, a release member for the focal plane shutter, a release member for the objective shutter, a manually operated common release lever operatively engaging both of said shutter release members so that movement of said common release lever actuates the said two release members to operate their respective shutters sequentially in the manner that first the said shutter laminae are closed, then the focal plane shutter opened, then the objective shutter opened and closed and said switch operated to close said circuit for taking a flash picture with the objective shutter alone and a spring in said objective shutter connected to its said releasing member for causing all of said release members and the two shutters to be restored to normal positions.

4. A shutter mechanism according to claim 3 in which a ring is rotatively and operatively connected to the said laminae to close and open the same, pins in said ring for rotating the same in its own plane in opposite directions, a pivoted plate engaging one of said pins to rotate the ring in a laminae closing direction, a pivoted finger engaging another of said pins to rotate said ring rapidly in opposite directions to open and close said laminae, an objective shutter release member and means operatively connecting said release member and the said plate and finger, respectively, to actuate the same to move the said pins as aforesaid and a cover plate for supporting said plate and finger.

5. The combination with a photographic camera having a focal plane curtain shutter and an objective, mechanism for taking flash pictures with said camera comprising an objective shutter in said objective, said objective shutter having movable shutter laminae and including a flash circuit controlling switch, means on said objective shutter for maintaining said laminae and the said switch in normally open positions, a release member for the objective shutter, operating connections between said release member and said laminae and switch, respectively, for first closing the laminae and thereafter quickly open and close the said switch for taking a flash picture when said objective shutter release member is actuated, a focal plane shutter release member, a manually operated common release lever operatively engaging both of said release members for simultaneously operating both of said members to open said focal plane shutter after the said laminae have been first closed and take the flash picture with the objective shutter alone and means in said mechanism for automatically restoring the laminae to normal open positions and open the said switch after the taking of the flash picture.

6. The combination according to claim 5 in which the said operating connections between the common release lever and the two shutter release members for simultaneously operating both of said members comprise a housing mounted upon the camera and enclosing said focal plane shutter release member, a release bolt slidably supported in said housing and contacting the focal plane release member to operate the focal plane shutter when said bolt is depressed, a shaft pivoted in the housing and connected to said bolt to depress the same when said shaft is rotated in one direction, means for securing the said common release lever to said shaft to rotate the same, the free end of said common release lever contacting the said objective shutter release member and a spring on said shaft for rotating it in the opposite direction to lift the said bolt and the common release member to normal positions whereby to restore the two shutter release members to normal inactive positions.

7. Shutter operating mechanism for a photographic camera having a focal plane curtain shutter and a front objective shutter with normally open shutter laminae, a release member for each of said shutters and a common release lever engageable with both of said release members to cause operations of both shutters for taking flash pictures with the front objective shutter alone when said common release lever is actuated, an electric flash unit secured to said camera and including circuit terminals within said front shutter, a switch in the latter to close the circuit, a ring in said front objective shutter supporting the laminae therein, a spring engaging said ring support to keep the laminae normally open, a plurality of pivotally interconnected levers supported in said objective shutter and forming a linkage operatively connected to and between said supporting ring and said shutter releasing member for moving said ring support against the action of said spring to close the laminae when said common release lever is moved to actuate the said two shutter releasing members and a latching device operatively connected to and between the common release lever and the focal plane shutter releasing member for operating the latter after the said laminae have been closed.

References Cited in the file of this patent

UNITED STATES PATENTS

| | | |
|---|---|---|
| 2,525,160 | Walker | Oct. 10, 1950 |
| 2,541,413 | Gorey | Feb. 13, 1951 |